US006581155B1

(12) United States Patent
Lohman et al.

(10) Patent No.: US 6,581,155 B1
(45) Date of Patent: Jun. 17, 2003

(54) PIPELINED, SUPERSCALAR FLOATING POINT UNIT HAVING OUT-OF-ORDER EXECUTION CAPABILITY AND PROCESSOR EMPLOYING THE SAME

(75) Inventors: Jeffrey Lohman, Plano, TX (US); Nicholas Samra, Austin, TX (US); Ram Gummadi, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/382,898

(22) Filed: Aug. 25, 1999

(51) Int. Cl.[7] .............................................. G06F 9/302
(52) U.S. Cl. ...................... 712/222; 712/223
(58) Field of Search ................. 712/223, 222, 712/212, 215, 23

(56) References Cited

U.S. PATENT DOCUMENTS

| 5,467,473 A | * | 11/1995 | Kahle et al. ................. 712/216 |
| 5,546,554 A | * | 8/1996 | Yung et al. .................. 711/203 |
| 5,826,070 A | * | 10/1998 | Olson et al. ................. 712/217 |
| 5,878,242 A | * | 3/1999 | Olson et al. ................. 712/216 |
| 5,961,636 A | * | 10/1999 | Brooks ........................ 712/228 |
| 6,148,395 A | * | 11/2000 | Dao ............................. 712/222 |
| 6,192,465 B1 | * | 2/2001 | Roberts ....................... 712/212 |
| 6,311,261 B1 | * | 10/2001 | Chamdani et al. ............. 712/23 |
| 6,405,305 B1 | * | 6/2002 | Meier et al. ................. 708/510 |

* cited by examiner

Primary Examiner—Eric Coleman

(57) ABSTRACT

For use in a processor having a first number of decode units for decoding an ordered stream of floating point instructions, a floating point unit (FPU) for receiving decoded ones of the floating point instructions and a method of processing the decoded ones of the floating point instructions. In one embodiment, the FPU includes: (1) a second number of floating point pipelines that execute the floating point instructions, the second number being at least one and less than the first number, the floating point pipeline having a load unit, an execution core and a store unit, (2) a floating point checkpoint buffer, coupled to the decode units, that queues the decoded ones of the floating point instructions for allocation to the floating point pipelines and (3) a floating point register file, coupled to and cooperable with the floating point checkpoint buffer, that preserves states of the execution core to allow the floating point pipelines to execute the floating point instructions out of order.

20 Claims, 3 Drawing Sheets

PIPELINED, SUPERSCALAR FLOATING POINT UNIT HAVING OUT-OF-ORDER EXECUTION CAPABILITY AND PROCESSOR EMPLOYING THE SAME

TECHNICAL FIELD OF THE INVENTION

The present invention is directed, in general, to microprocessors and, more particularly, to a processor architecture employing a pipelined, superscalar floating point unit (FPU) that is capable of executing floating point instructions out of order.

BACKGROUND OF THE INVENTION

The ever-growing requirement for high performance computers demands that computer hardware architectures maximize software performance. Conventional computer architectures are made up of three primary components: (1) a processor, (2) a system memory and (3) one or more input/output devices. The processor controls the system memory and the input/output ("I/O") devices. The system memory stores not only data, but also instructions that the processor is capable of retrieving and executing to cause the computer to perform one or more desired processes or functions. The I/O devices are operative to interact with a user through a graphical user interface ("GUI") (such as provided by Microsoft Windows™ or IBM OS/2™), a network portal device, a printer, a mouse or other conventional device for facilitating interaction between the user and the computer.

Over the years, the quest for ever-increasing processing speeds has followed different directions. One approach to improve computer performance is to increase the rate of the clock that drives the processor. As the clock rate increases, however, the processor's power consumption and temperature also increase. Increased power consumption is expensive and high circuit temperatures may damage the processor. Further, the processor clock rate may not increase beyond a threshold physical speed at which signals may traverse the processor. Simply stated, there is a practical maximum to the clock rate that is acceptable to conventional processors.

An alternate approach to improve computer performance is to increase the number of instructions executed per clock cycle by the processor ("processor throughput"). One technique for increasing processor throughput is pipelining, which calls for the processor to be divided into separate processing stages (collectively termed a "pipeline"). Instructions are processed in an "assembly line" fashion in the processing stages. Each processing stage is optimized to perform a particular processing function, thereby causing the processor as a whole to become faster.

"Superpipelining" extends the pipelining concept further by allowing the simultaneous processing of multiple instructions in the pipeline. Consider, as an example, a processor in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall processor speed is "superscalar" processing. Superscalar processing calls for multiple instructions to be processed per clock cycle. Assuming that instructions are independent of one another (the execution of each instruction does not depend upon the execution of any other instruction), processor throughput is increased in proportion to the number of instructions processed per clock cycle ("degree of scalability"). If, for example, a particular processor architecture is superscalar to degree three (i.e., three instructions are processed during each clock cycle), the instruction throughput of the processor is theoretically tripled.

These techniques are not mutually exclusive; processors may be both superpipelined and superscalar. However, operation of such processors in practice is often far from ideal, as instructions tend to depend upon one another and are also often not executed efficiently within the pipeline stages. In actual operation, instructions often require varying amounts of processor resources, creating interruptions ("bubbles" or "stalls") in the flow of instructions through the pipeline. Consequently, while superpipelining and superscalar techniques do increase throughput, the actual throughput of the processor ultimately depends upon the particular instructions processed during a given period of time and the particular implementation of the processor's architecture.

The speed at which a processor can perform a desired task is also a function of the number of instructions required to code the task. A processor may require one or many clock cycles to execute a particular instruction. Thus, in order to enhance the speed at which a processor can perform a desired task, both the number of instructions used to code the task as well as the number of clock cycles required to execute each instruction should be minimized.

Statistically, certain instructions are executed more frequently than others. If the design of a processor is optimized to rapidly process the instructions which occur most frequently, then the overall throughput of the processor can be increased. Unfortunately, the optimization of a processor for certain frequent instructions is usually obtained only at the expense of other less frequent instructions, or requires additional circuitry, which increases the size of the processor.

What is needed in the art is a more efficient way to execute instructions in a processor and, more specifically, a faster way of executing floating point instructions in a processor.

SUMMARY OF THE INVENTION

To address the above-discussed deficiencies of the prior art, it is a primary object of the present invention to provide a more efficient FPU architecture. In the attainment of the above primary object, the present invention provides, for use in a processor having a first number of decode units for decoding an ordered stream of floating point instructions, an FPU for receiving decoded ones of the floating point instructions and a method of processing the decoded ones of the floating point instructions. In one embodiment, the FPU includes: (1) a second number of floating point pipelines that execute the floating point instructions, the second number being at least one and less than the first number, the floating point pipeline having a load unit, an execution core and a store unit, (2) a floating point checkpoint buffer, coupled to the decode units, that queues the decoded ones of the floating point instructions for allocation to the floating point pipelines and (3) a floating point register file, coupled to and cooperable with the floating point checkpoint buffer, that preserves states of the execution core to allow the floating point pipelines to execute the floating point instructions out of order.

The present invention therefore introduces a novel FPU architecture in which floating point instructions received from a larger number of decode units can be appropriately buffered and checkpointed to allow out-of-order execution thereof in a smaller number of floating point pipelines. The first number can be two or more and the second number can be one or more, provided that the second number always remain less than the first number.

In one embodiment of the present invention, the FPU further includes reservation stations, coupled to the floating point checkpoint buffer and corresponding to each of the floating point pipelines, that controls the allocation of the floating point instructions. In an FPU having at least two floating point pipelines, the reservation stations are therefore distributed between or among the pipelines.

In one embodiment of the present invention, the first number is three, the second number is two and the floating point register file comprises a floating point physical register file and a floating point logical register file. The structure and operation of the register file(s) will be set forth in the Detailed Description to follow.

In one embodiment of the present invention, the second number is two, the FPU comprising a first floating point pipeline having a floating point adder unit and a second floating point pipeline having a floating point multiplier unit, the FPU being asymmetric. Of course, the present invention is fully operable with symmetric pipelines.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

1. Integrated Processor System

Figure 1:
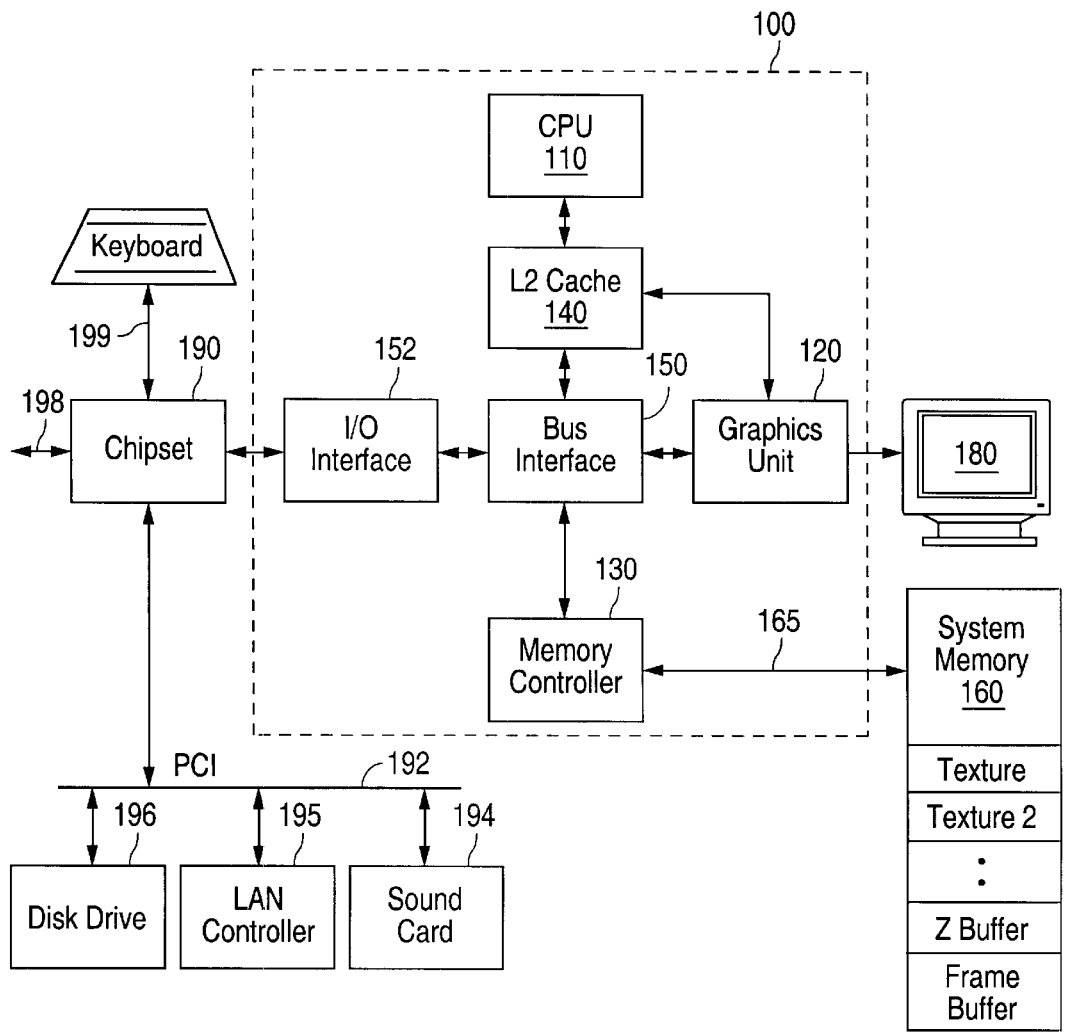
FIG. 1 illustrates an exemplary integrated processor system including an exemplary integrated microprocessor.

Referring initially to FIG. 1, illustrated is an exemplary integrated processor system, including an integrated microprocessor 100. The integrated microprocessor, includes a CPU 110 with dual integer and dual floating point execution units, separate load/store and branch units, and L1 instruction and data caches. Integrated onto the microprocessor die is a graphics unit 120, a system memory controller 130, an L2 cache 140 shared by the CPU and the graphics unit. A bus interface unit 150 interfaces the CPU, graphics unit and L2 cache to the memory controller.

The integrated memory controller 130 bridges the processor 100 to system memory 160, and may provide data compression/decompression to reduce bus traffic over the external memory bus 165 which preferably, although not exclusively, has a RAMbus™, fast SDRAM or other type protocol. The integrated graphics unit 120 provides TFT, DSTN, RGB or other type of video output to drive display 180.

The bus interface unit 150 interfaces, through an I/O interface 152, the processor 100 to a chipset bridge 190 for a conventional peripheral bus 192 (e.g., PCI) connection to peripherals such as sound card 194, LAN controller 195, disk drive 196 as well as a fast serial link 198 (e.g., IEEE 1394 "firewire" bus and/or universal serial bus "USB") and a relatively slow I/O port 199 for peripherals such as keyboard and mouse. Alternatively, chipset bridge 190 may integrate local bus functions such as sound, disk drive control, modem, network adapter, etc.

2. Integrated CPU

Figure 2:
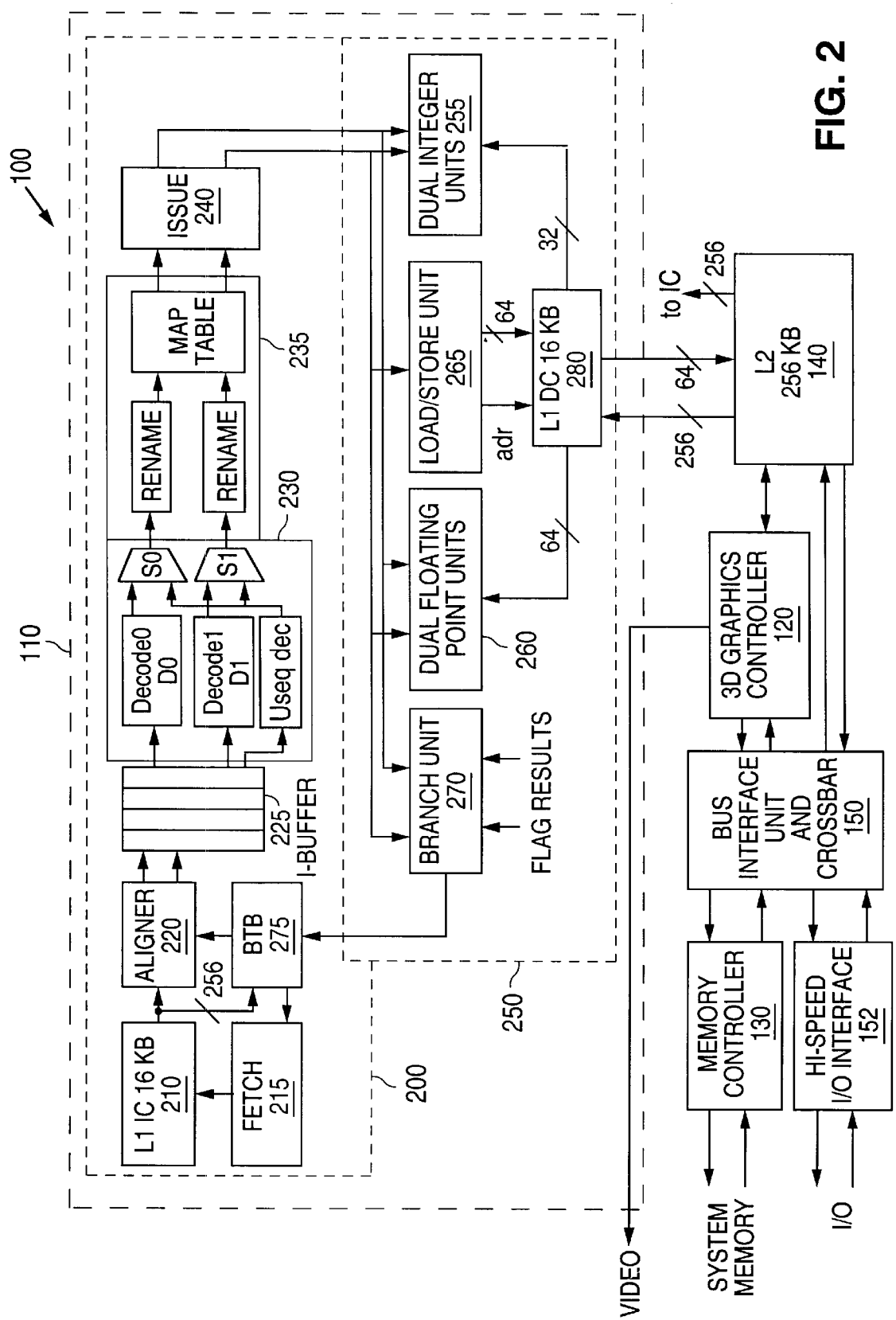
FIG. 2 illustrates, in more detail, the exemplary integrated microprocessor of FIG. 1.

Turning now to FIG. 2, illustrated in more detail is the exemplary integrated microprocessor 100, including CPU 110 integrated with graphics controller 120, memory controller 130, and L2 unified cache 140 (256 KB). CPU 110 includes an execution pipeline with instruction decode/dispatch logic 200 and functional units 250.

Instruction decode/dispatch logic 200 decodes variable length x86 instructions into nodes (operations) each containing source, destination, and control. Each instruction maps into 1, 2, or more nodes, which are formed into checkpoints for issue in parallel to the functional units 250. The exemplary execution pipeline includes three integer units (EX) 255, two pipelined floating point units (FP) 260, a two load/store unit (LDST) 265, and a branch unit (BR) 270, so a single checkpoint can include up to 3 EX, 3 FP, 2 LDST, and 2 BR nodes which can be issued in parallel. An L1 data cache 280 (16 KB) receives data requests from the LDST unit, and in the case of an L1 hit supplies the requested data to appropriate EX or FP unit.

The BR unit 270 executes branch operations based on flag results from the EX units 255 predicted (taken/not-taken) and not-predicted (undetected) branches are resolved (mispredicts incur a 12 clock penalty), and branch information supplied to a BTB 275, including branch address, target address, and resolution (taken or not taken). The BTB includes a 1 KB target cache, a 7-bit history and prediction ROM, and a 16 entry return stack.

Instruction decode/dispatch logic 200 includes an L1 instruction cache 210 (16 KB) storing 32-byte cache lines (8 words/4qwords). Each fetch operation, a fetch unit 215 fetches a cache line of 32 instruction bytes from the L1 instruction cache to aligner logic 220. The fetch unit 215 either (a) generates a fetch address by incrementing the previous fetch address (sequential fetch), or if the previous fetch address hit in the BTB 275, (b) switches the code stream by supplying the fetch address for the cache line containing the target address provided by the BTB. The fetch unit supplies a linear address simultaneously to the L1 instruction cache 210 and the BTB 275—a two level TLB structure (a 32 entry L1 instruction TLB and a 256 entry shared L2 TLB) supplies a corresponding physical address to the L1 cache to complete cache access.

Aligner logic 220 identifies up to three x86 variable length instructions per clock instructions are buffered in an instruction buffer 225, along with decode and issue constraints. Decoder 230 transfers instructions from the instruction buffer to the appropriate one (as determined by decode constraints stored with the instruction) of decoders D0, D1, D2, and Useq (a microsequencer). D0, D1, and D2 define three decode slots (or paths) S0, S1, and S2 with the Useq decoder feeding nodes into all slots simultaneously.

D0, D1, and D2 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to D0 and D1. The Useq decoder handles instructions that decode into more than three nodes/operations (e.g., far calls/returns, irets, segment register loads, floating point divides, floating point transcendentals) where each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint—up to 16 checkpoints may be active (i.e., issued to functional units).

Nodes are issued into reservation stations in each functional unit. Once in the reservation stations, the nodes initiate and complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support MMX™ and 3Dnow™, as well as standard x87 floating point, instruction execution—FPU0 includes a pipelined FAdder and FPU1 includes a pipelined Fmultipler, both supporting packed SIMD operations.

Integer multiply operations are issued to FPU1 with the Fmultiplier, and integer divide operations are issued as separate nodes to both FPU0 and FPU1, so that integer EX operations can execute in parallel with integer multiplies and divides. Results are forwarded between EX0/EX1 and FPU0/FPU1 in a single cycle.

The dual LDST unit 265 executes memory reference operations as loads/stores to/from the data cache 280 (or L2 cache 140). The LDST unit performs pipelined linear address calculation and physical (paged) address translation, followed by data cache access with the physical (translated) address. Address translations are performed in order using a two level TLB structure (a 32 entry L1 data TLB and the 256 entry shared L2 TLB). Up to 4 pending L1 misses can be outstanding miss data returns out of order (from either the L2 cache or system memory).

The exemplary 16 KB L1 instruction cache 210 is single-ported 4-way associative, with 2 pending misses. The exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, the L2 cache 140 transfers an entire cache line (32 bytes/256 bits) in one cycle with a 7 clock access latency for L1 misses that hit in the L2.

The exemplary 256 KB L2 cache 140 is 8-way associative and 8-way interleaved. The L2 cache 140 supports one L1 (code/data) miss per cycle and one L1 store or L2 fill per cycle provided that the L1 store or the L2 fill is to a different interleave than the L1 (code/data) miss. Portions or all of 2 of the 8 ways may be locked down for use by the graphics controller 120.

For integer register-register operations, the execution pipeline is 11 stages from code fetch to completion: two cache access stages IC1 and IC2, two alignment stages AL1 and AL2, three decode/rename stages DEC0–DEC2, checkpoint issue stage ISS, and reservation stage RS, followed by the execute and result write-back/forward stages EX and WB. For integer register-memory operations, the LDST unit pipeline adds an additional 4 stages between RS and EX: address calculation AC, translation XL, and data cache access and drive back DC and DB. The floating point adder pipeline is 4 stages, and the floating point multiply pipeline is 5 stages.

Figure 3:
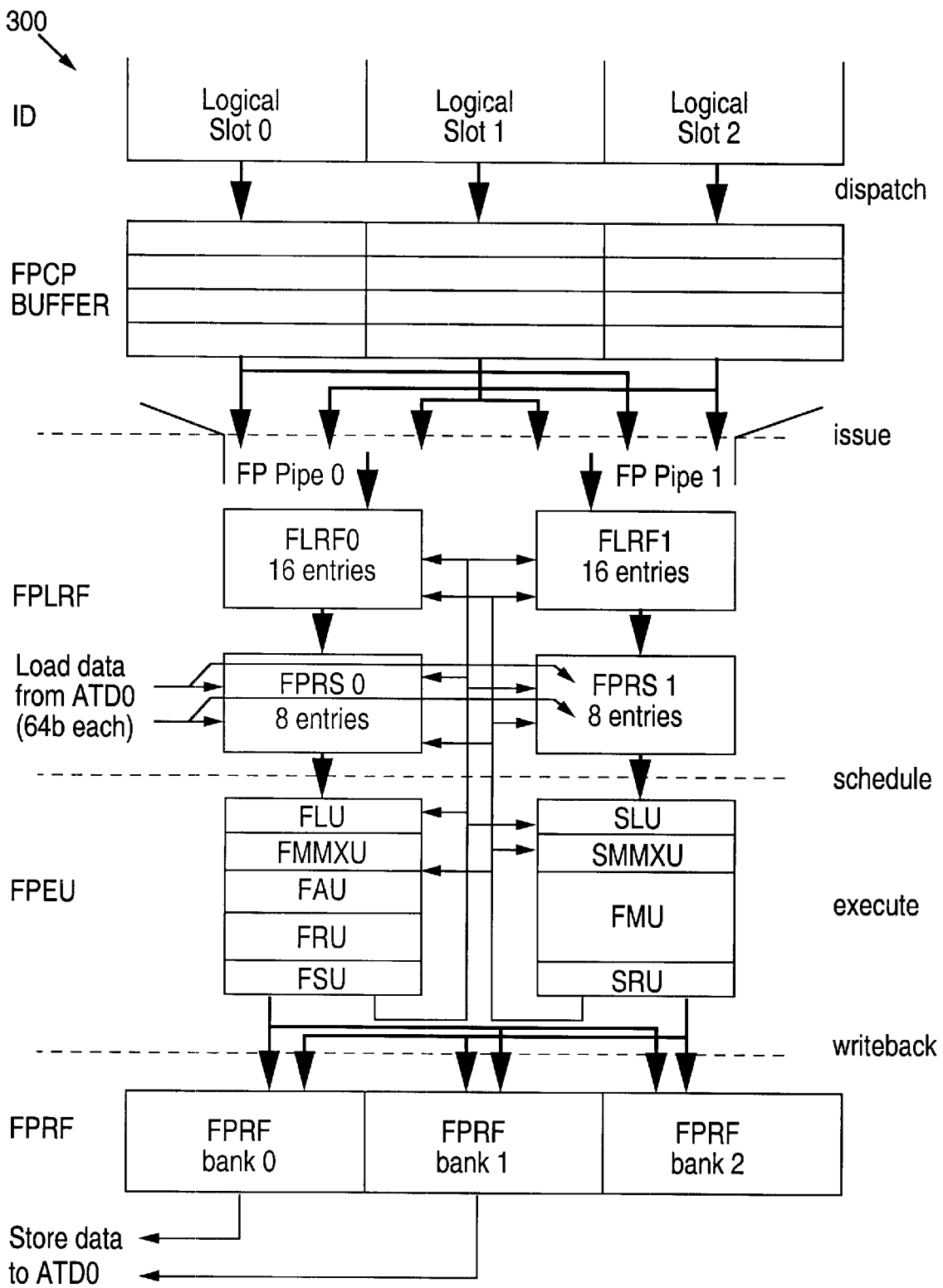
FIG. 3 illustrates a diagram of an embodiment of a superscaler floating point system constructed according to the principles of the present invention.

Turning now to FIG. 3, illustrated is a diagram of an embodiment of a superscaler floating point system 300 constructed according to the principles of the present invention. The floating point system 300 includes an instruction decode (ID) unit and a floating point checkpoint (FPCP) buffer, each having first, second and third logical instruction slots, slot 0, slot 1, slot 2. The floating point system 300 further includes a floating point unit (FPU) having a floating point logical register file (FPLRF) and a floating point execution unit (FPEU) associated with a first floating point pipeline (FP pipe 0) and a second floating point pipeline (FP pipe 1). The floating point system 300 still further includes a floating point register file (FPRF) having first, second and third banks, bank 0, bank 1, bank 2.

The FPLRF includes a first floating logical register file (FLRF0) and a first floating point reservation station (FPRS0) associated with the FP pipe 0. The FPLRF further includes a second floating logical register file (FLRF1) and a second floating point reservation station (FPRS1) associated with the FP pipe 1. The FPEU includes a first load unit (FLU), a first MMX unit (FMMXU), a floating point adder unit (FAU), a first floating point round unit (FRU) and a floating point store unit (FSU) associated with the FP pipe 0. The FPEU further includes a second load unit (SLU), a second MMX unit (SMMXU), a floating point multiplication multiplier (FMU) and a second floating point round unit (SRU) associated with the FP pipe 1.

The FPU in this embodiment is designed to be asymmetric and superscalar. This configuration allows for maximum throughput without excessive duplication of execution resources. The FPU execution core, when coupled with scheduling hardware and register files as shown, is able to issue and execute any combination of floating point operations in a sustained manner and in full out-of-order mode. These benefits occur through better utilization of the floating point execution core and the use of register renaming to eliminate resource dependent stalls.

The primary object of the present invention is to provide a more efficient FPU architecture for use in a processor having a first number of ID units (three in this embodiment) for decoding an ordered stream of floating point instructions. The FPU receives these decoded floating point instructions and uses a method of processing the decoded floating point instructions. The FPU includes a second number of floating point pipelines (two in this embodiment) that execute the floating point instructions. In general, the second number is at least one and is less than the first number associated with the ID units.

The FP pipe 0 is seen to have a first load unit (the FLU), an execution core (the FMMXU, the FAU and the FRU) and a first store unit (the FSU). The FPCP buffer, which is coupled to the ID units, queues the decoded floating point instructions for allocation to the floating point pipelines. Then, the FPLRF, which is coupled to and cooperable with the FPCP buffer, preserves states of the execution core to allow the floating point pipelines to execute the floating point instructions out of order.

The present invention therefore introduces a novel FPU architecture in which floating point instructions received from a larger number of decode units can be appropriately buffered and checkpointed to allow out-of-order execution in a smaller number of floating point pipelines. The first number can be two or more and the second number can be one or more, provided that the second number always remains less than the first number.

The ID unit may be the same module that processes integer instructions. The ID unit contains the floating point register stack pointer and translates stacked-based register references to FLRF indices. The ID unit also contains hardware to detect and flag intra-checkpoint RAW and WAW dependencies. At each cycle, the ID unit may dispatch one checkpoint containing one to three nodes placed in the slot 0, the slot 1 or the slot 2. The nodes of a checkpoint may contain any combination of integer and floating point instructions, where the instructions are arranged in program order. Nodes containing memory references (loads/stores) must dispatch only in the slot 0 or the slot 1. If the checkpoint being dispatched contains at least one floating point node, it allocates an entry in the FPCP buffer and writes the floating point nodes into that entry according to the slots in which they are dispatched. When the FPCP buffer is full, it causes the ID unit to stall, thereby inhibiting the dispatching of floating point nodes.

The FPCP buffer may issue up to two nodes into the FP pipe 0 and FP pipe 1 during each cycle. The nodes issued by the FPCP buffer in a given cycle must be from the same checkpoint and must be the oldest two unissued nodes in that checkpoint although they do not have to be in order with respect to the FP pipe 0 and the FP pipe 1. That is, if there is a floating point node in the slot 0, it must issue either before or simultaneously with a floating point node in the slot 1. Some FP nodes may be issued only to one of the floating point pipelines as indicated below.

| INSTRUCTION | FP pipe 0 | FP pipe 1 |
| --- | --- | --- |
| FP Add, Compare, Subtract | X | |
| FP Multiply, Divide | | X |
| FP Move, ABS, CHS | X | X |
| FP Loads: Single or Double Precision | X | X |
| FP Loads: Extended Precision, Integer | X | |
| FP Stores | X | |
| MMX Shifts | X | |
| MMX Multiply | | X |
| All Remaining MMX Instructions | X | X |

Along with the node and operand information, the FPCP buffer must indicate to the FPLRF any dependencies between the two nodes being issued. Additionally, the FPCP buffer must control updates to the register file, especially with respect to WAW hazards between the two nodes. The FPCP buffer is stalled if either the FPRS0 or the FPRS1 is full.

The FLRF0 and the FLRF1 contain a committed register file (CRF) having both the current state and the architected state of the floating point stack. The FLRF0 and the FLRF1 are also responsible for register renaming between interdependent floating point nodes. Since there is no correlation between a logical slot to which a node may be dispatched and the floating point pipeline to which it is issued, the floating point stack/registers must be renamed using both the checkpoint and the logical slot. In addition, a bit indicating which floating point pipeline will produce the result is also added to the renamed stack/register to simplify the snooping logic. Complex instructions in the FPU may be implemented similarly to complex integer instructions. A micro-sequencer will generate a series of nodes to implement the function. The FLRF0 and the FLRF1 each have eight temporary registers (entries) to facilitate these instructions.

The FPRS0 and the FPRS1 are responsible for scheduling the oldest node that is ready, allowing for fully pipelined execution and out-of-order writeback. The FPRF contains the results of each node. The information is organized by checkpoint number and logical slot number, so that either floating point pipeline may write a result to any of the three FPRF banks, where each of the FPRF banks corresponds to a logical slot. The FPRF reports on the oldest three non-committed checkpoints. A commit unit is used to combine that information with the status from an integer physical register file to determine the status of a given checkpoint.

From the above, it is apparent that the present invention provides, for use in a processor having a first number of decode units for decoding an ordered stream of floating point instructions, a floating point unit (FPU) for receiving decoded ones of the floating point instructions and a method of processing the decoded ones of the floating point instructions. In one embodiment, the FPU includes: (1) a second number of floating point pipelines that execute the floating point instructions, the second number being at least one and less than the first number, the floating point pipeline having a load unit, an execution core and a store unit, (2) a floating point checkpoint buffer, coupled to the decode units, that queues the decoded ones of the floating point instructions for allocation to the floating point pipelines and (3) a floating point register file, coupled to and cooperable with the floating point checkpoint buffer, that preserves states of the execution core to allow the floating point pipelines to execute the floating point instructions out of order.

Although the present invention and its advantages have been described in detail, those skilled in the art should understand that they can make various changes, substitutions and alterations herein without departing from the spirit and scope of the invention in its broadest form.

What is claimed is:

1. For use in a processor having a first number of decode units for decoding an ordered stream of floating point instructions, a floating point unit (FPU) for receiving decoded ones of said floating point instructions, comprising:

a second number of floating point pipelines that execute said floating point instructions, said second number being at least one and less than said first number, said floating point pipeline having a load unit, an execution core and a store unit;

a floating point checkpoint buffer, coupled to said decode units, that queues said decoded ones of said floating point instructions for allocation to said floating point pipelines; and a floating point register file, coupled to and cooperable with said floating point checkpoint buffer, that preserves states of said execution core to allow said floating point pipelines to execute said floating point instructions out of order.

2. The FPU as recited in claim 1 further comprising reservation stations, coupled to said floating point checkpoint buffer and corresponding to each of said floating point pipelines, that controls said allocation of said floating point instructions.

3. The FPU as recited in claim 1 wherein said first number is three, said second number is two and said floating point register file comprises a floating point physical register file and a floating point logical register file.

4. The FPU as recited in claim 1 wherein said second number is two, said FPU comprising a first floating point pipeline having a floating point adder unit and a second floating point pipeline having a floating point multiplier unit, said FPU being asymmetric.

5. For use in a processor having a first number of decode means for decoding an ordered stream of floating point instructions, a floating point unit (FPU) for receiving decoded ones of said floating point instructions, comprising:

a second number of floating point pipeline means for executing said floating point instructions, said second number being at least one and less than said first number, said floating point pipeline means having means for loading floating point numbers, executing said floating point instructions and storing said floating point numbers;

floating point checkpoint buffer means, coupled to said decode means, for queuing said decoded ones of said floating point instructions for allocation to said floating point pipeline means; and floating point register file means, coupled to and cooperable with said floating point checkpoint buffer means, for preserving states of said floating point pipeline means to allow said floating point pipeline means to execute said floating point instructions out of order.

6. The FPU as recited in claim 5 further comprising reservation station means, coupled to said floating point checkpoint buffer means and corresponding to each of said floating point pipeline means, that controls said allocation of said floating point instructions.

7. The FPU as recited in claim 5 wherein said first number is three, said second number is two and said floating point register file means comprises floating point physical register file means and floating point logical register file means.

8. The FPU as recited in claim 5 wherein said second number is two, said FPU comprising first floating point pipeline means having a means for adding said floating point numbers and second floating point pipeline means having means for multiplying said floating point numbers, said FPU being asymmetric.

9. For use in a processor having a first number of decode means for decoding an ordered stream of floating point instructions, a method of processing decoded ones of said floating point instructions, comprising the steps of:

queuing, in a floating point checkpoint buffer, said decoded ones of said floating point instructions for allocation to a second number of floating point pipelines, said second number being at least one and less than said first number, said floating point pipeline having a load unit, an execution core and a store unit; and preserving, in a floating point register file, states of said floating point pipelines to allow said floating point pipelines to execute said floating point instructions out of order.

10. The method as recited in claim 9 further comprising the step of controlling said allocation of said floating point instructions with reservation stations coupled to said floating point checkpoint buffer means and corresponding to each of said floating point pipelines.

11. The method as recited in claim 9 wherein said first number is three, said second number is two and said floating point register file comprises floating point physical register file and floating point logical register file.

12. The method as recited in claim 9 wherein said second number is two, said method further comprising the steps of:

adding floating point numbers in a first floating point pipeline; and multiplying floating point numbers in a second floating point pipeline.

13. A computer system, comprising:

(a) a processor having an integer execution core containing at least one execution pipeline for executing integer instructions and a floating point unit (FPU) for executing floating point instructions, said processor capable of addressing segments of system memory coupled thereto;

(b) system memory for storing integer and floating point instructions including instructions for accessing said system memory;

(c) said processor including a first number of decode units for decoding an ordered stream of floating point instructions fetched from said system memory; and (d) said FPU further including:
  (i) a second number of floating point pipelines that execute said floating point instructions, said second number being at least one and less than said first number, said floating point pipeline having a load unit, an execution core and a store unit,
  (ii) a floating point checkpoint buffer, coupled to said decode units, that queues said decoded ones of said floating point instructions for allocation to said floating point pipelines, and
  (iii) a floating point register file, coupled to and cooperable with said floating point checkpoint buffer, that preserves states of said execution core to allow said floating point pipelines to execute said floating point instructions out of order.

14. The computer system as recited in claim 13 further comprising reservation stations, coupled to said floating point checkpoint buffer and corresponding to each of said floating point pipelines, that controls said allocation of said floating point instructions.

15. The computer system as recited in claim 13 wherein said first number is three, said second number is two and said floating point register file comprises a floating point physical register file and a floating point logical register file.

16. The computer system as recited in claim 13 wherein said second number is two, said FPU comprising a first floating point pipeline having a floating point adder unit and a second floating point pipeline having a floating point multiplier unit, said FPU being asymmetric.

17. A method of operating a computer system, comprising the steps of:

(a) applying power to a processor having an integer execution core containing at least one execution pipeline for executing integer instructions and a floating point unit (FPU) for executing floating point instructions, said processor capable of addressing segments of system memory coupled thereto;

(b) storing integer and floating point instructions in a system memory, said instructions including instructions for accessing said system memory;

(c) decoding an ordered stream of floating point instructions fetched from said system memory; and (d) executing instructions in said processor, said FPU further including:
  (i) a second number of floating point pipelines that execute said floating point instructions, said second number being at least one and less than said first number, said floating point pipeline having a load unit, an execution core and a store unit,
  (ii) a floating point checkpoint buffer, coupled to said decode units, that queues said decoded ones of said floating point instructions for allocation to said floating point pipelines, and
  (iii) a floating point register file, coupled to and cooperable with said floating point checkpoint buffer, that preserves states of said execution core to allow said floating point pipelines to execute said floating point instructions out of order.

18. The method as recited in claim 17 further comprising reservation stations, coupled to said floating point checkpoint buffer and corresponding to each of said floating point pipelines, that controls said allocation of said floating point instructions.

19. The method as recited in claim 17 wherein said first number is three, said second number is two and said floating point register file comprises a floating point physical register file and a floating point logical register file.

20. The method as recited in claim 17 wherein said second number is two, said FPU comprising a first floating point pipeline having a floating point adder unit and a second floating point pipeline having a floating point multiplier unit, said FPU being asymmetric.

\* \* \* \* \*